(12) United States Patent
Yokoi

(10) Patent No.: US 9,277,261 B2
(45) Date of Patent: Mar. 1, 2016

(54) INFORMATION PROCESSING APPARATUS AND CONTROL METHOD THEREOF

(71) Applicant: CANON KABUSHIKI KAISHA, Tokyo (JP)

(72) Inventor: Mayu Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 14/328,019

(22) Filed: Jul. 10, 2014

(65) Prior Publication Data

US 2015/0022676 A1 Jan. 22, 2015

(30) Foreign Application Priority Data

Jul. 18, 2013 (JP) ................................. 2013-149934

(51) Int. Cl.

| | |
|---|---|
| *H04N 21/262* | (2011.01) |
| *H04N 9/804* | (2006.01) |
| *H04N 9/82* | (2006.01) |
| *H04N 5/232* | (2006.01) |
| *H04N 21/8543* | (2011.01) |
| *H04N 21/845* | (2011.01) |
| *H04N 5/77* | (2006.01) |

(52) U.S. Cl.
CPC ..... *H04N 21/26258* (2013.01); *H04N 5/23206* (2013.01); *H04N 5/77* (2013.01); *H04N 9/8042* (2013.01); *H04N 9/8211* (2013.01); *H04N 21/8456* (2013.01); *H04N 21/8543* (2013.01)

(58) Field of Classification Search
CPC .................... H04N 21/26258; H04N 21/8543; H04N 21/8456; H04N 9/8042; H04N 9/8211; H04N 5/23206; H04N 5/77
See application file for complete search history.

(56) References Cited

U.S. PATENT DOCUMENTS

| 2010/0092095 | A1 | 4/2010 | King et al. |
| 2013/0290402 | A1* | 10/2013 | Gavade ............ H04N 21/26258 709/203 |
| 2014/0019635 | A1 | 1/2014 | Reznik et al. |

FOREIGN PATENT DOCUMENTS

| JP | 10-164537 A | 6/1998 |
| JP | 2011-244097 A | 12/2011 |

OTHER PUBLICATIONS

Office Action dated May 13, 2015, issued in a related U.S. Appl. No. 14/328,040.

* cited by examiner

*Primary Examiner* — Christopher K Peterson
(74) *Attorney, Agent, or Firm* — Cowan, Liebowitz & Latman, P.C.

(57) ABSTRACT

An information processing apparatus which communicates with an image capturing apparatus and reproduces video data obtained by the image capturing apparatus, comprises a unit which requests a segment list in which information of segments of video data is written; a unit which acquires the requested segment list; a unit which decides which segment, from the segments in the acquired segment list to request; a unit which requests the decided segment from the image capturing apparatus; and a unit which acquires the requested segment, in the case where a number of segments in the acquired segment list is greater than a first threshold, a predetermined segment from the segments in the segment list is requested and the predetermined segment is neither the latest segment nor the earliest segment in the segment list.

14 Claims, 8 Drawing Sheets

FIG. 4

```
#EXTM3U                              ~4011
#EXT-X-VERSION:3                     ~4012
#EXTINF:0.5,                         ~4013
http://192.168.0.7/dv/stream?seq=1   ~4014
```
4010

INFORMATION PROCESSING APPARATUS AND CONTROL METHOD THEREOF

BACKGROUND OF THE INVENTION

1. Field of the Invention

The present invention relates to the transmission of data between two devices via a network.

2. Description of the Related Art

A method for executing streaming data transfer using Hypertext Transfer Protocol (HTTP)/Transmission Control Protocol (TCP), which have conventionally been used for file transfer, is known as a conventional technique for streaming. Depending on the state of the network, delay may occur due to congestion when streaming using this method. Accordingly, there is a technique that calculates a normal reproduction time of video packets held in a client buffer based on a frame number and a framerate and furthermore computes a total reproduction time for the contents of the buffer, and determines a video reproduction speed in accordance with the lengths of the times (Japanese Patent Laid-Open No. 2011-244097). Meanwhile, Japanese Patent Laid-Open No. 10-164537 discloses deleting all of the data within a terminal buffer in order to reduce delay when performing remote operations from the terminal.

However, although Japanese Patent Laid-Open No. 2011-244097 does lengthen the reproduction time in the case where a worsening in the network state makes data transfer difficult, the client-side buffer nevertheless will ultimately overflow. In addition, although Japanese Patent Laid-Open No. 10-164537 reduces delay time and improves operability by deleting all of the server-side buffer data, a large amount of data held in the client-side buffer will be deleted entirely, and thus long, continuous videos will be deleted.

SUMMARY OF THE INVENTION

The present invention has been made in consideration of the aforementioned problems, and realizes a technique for appropriately alleviating delay when viewing streamed content.

In order to solve the aforementioned problems, the present invention provides an information processing apparatus which has a communication unit configured to communicate with an image capturing apparatus, and which reproduces video data obtained by sequentially acquiring segments indicating divisional data of the video data obtained by image capturing of the image capturing apparatus, the information processing apparatus comprising: a list requesting unit configured to request, via the communication unit, a segment list in which information of segments of video data being captured by the image capturing apparatus is written, from the image capturing apparatus; a list acquiring unit configured to acquire the segment list requested by the list requesting unit; a deciding unit configured to decide which segment, from the segments in the segment list acquired by the list acquiring unit, to request; a segment requesting unit configured to request, via the communication unit, the segment decided on by the deciding unit, from the image capturing apparatus; and a segment acquiring unit configured to acquire the segment requested by the segment requesting unit, wherein in the case where a number of segments in the segment list acquired by the list acquiring unit is greater than a first threshold, the segment requesting unit requests a predetermined segment from the segments in the segment list; and wherein the predetermined segment is neither the latest segment nor the earliest segment in the segment list.

In order to solve the aforementioned problems, the present invention provides a control method of an information processing apparatus which has a communication unit configured to communicate with an image capturing apparatus, and which reproduces video data obtained by sequentially acquiring segments indicating divisional data of the video data obtained by image capturing of the image capturing apparatus, the method comprising: a list requesting step of requesting, via the communication unit, a segment list in which information of segments of video data being captured by the image capturing apparatus is written, from the image capturing apparatus; a list acquiring step of acquiring the segment list requested in the list requesting step; a deciding step of deciding which segment, from the segments in the segment list acquired in the list acquiring step, to request; a segment requesting step of requesting, via the communication unit, the segment decided on in the deciding step, from the image capturing apparatus; and a segment acquiring step of acquiring the segment requested in the segment requesting step, wherein in the case where the number of segments in the segment list acquired in the list acquiring step is greater than a first threshold, a predetermined segment from the segments in the segment list is requested in the segment requesting step; and wherein the predetermined segment is neither the latest segment nor the earliest segment in the segment list.

According to the present invention, delay can be appropriately alleviated when viewing streamed content.

Further features of the present invention will become apparent from the following description of an exemplary embodiment (with reference to the attached drawings).

BRIEF DESCRIPTION OF THE DRAWINGS

FIG. 4 is a diagram illustrating an example of a playlist according to the embodiment.

DESCRIPTION OF THE EMBODIMENTS

Figure 1:
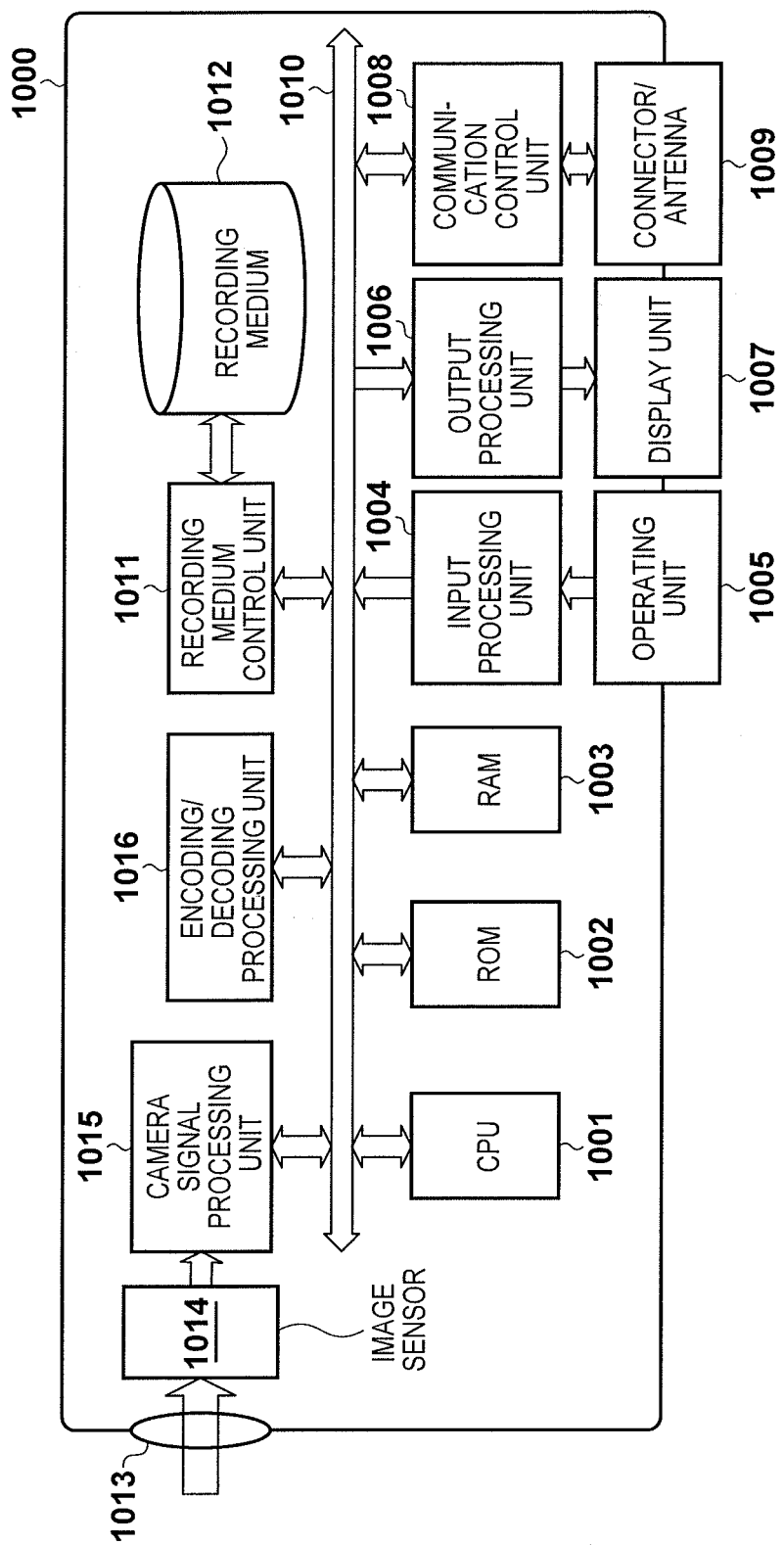
FIG. 1 is a block diagram illustrating an example of the configuration of an image capturing apparatus according to an embodiment of the present invention.

An embodiment of the present invention will be described in detail below. The following embodiment is merely an example for practicing the present invention. The embodiment should be properly modified or changed depending on various conditions and the structure of an apparatus to which the present invention is applied. The present invention should not be limited to the following embodiment.

Hereinafter, the present invention will be described using a system in which an image capturing apparatus 1000 serving as a server and a communication apparatus 2000 serving as a client are communicably connected as an example. In this example, video captured by the image capturing apparatus 1000 is transmitted sequentially in real time, which enables the video to be streamed live and viewed in the communication apparatus 2000. Live streaming will be described in detail later. Although the present embodiment describes an example in which the image capturing apparatus 1000 is applied in a digital video camera and the communication apparatus 2000 is applied in a communication terminal such as a smartphone, the present invention is not limited thereto. For example, the present invention can also be applied in a system in which the image capturing apparatus is a mobile phone, a portable media player such as a tablet terminal, or the like that includes a camera and the communication apparatus is an information processing apparatus such as a personal computer, a mobile phone, a tablet terminal, a television, or the like.

Configuration of Image Capturing Apparatus

An overview of the configuration and functions of the image capturing apparatus according to an embodiment of the present invention will be given with reference to FIG. 1.

In the image capturing apparatus ("camera" hereinafter) 1000 shown in FIG. 1, a central processing unit (CPU) 1001, a read-only memory (ROM) 1002, a random access memory (RAM) 1003, an input processing unit 1004, an output processing unit 1006, a communication control unit 1008, a recording medium control unit 1011, a camera signal processing unit 1015, and an encoding/decoding processing unit 1016 are connected to an internal bus 1010. The various units connected to the internal bus 1010 are capable of exchanging data with one another via the internal bus 1010.

The ROM 1002 stores various types of programs, settings data, and so on through which the CPU 1001 operates. The ROM 1002 also includes a flash memory or the like. The RAM 1003 stores programs, variables, temporary data for tasks, and so on required by the CPU 1001 during operation.

The CPU 1001 controls the various units of the camera 1000 using the RAM 1003 as a working memory, in accordance with programs stored in the ROM 1002 or in a recording medium 1012.

An optical system 1013 corresponds to an image capturing lens including a focusing mechanism, an aperture mechanism, and the like, and forms an optical image of a subject. An image sensor 1014 is configured of a CCD, a CMOS sensor, or the like, and includes an A/D converter; the image sensor 1014 converts the optical image into an analog electrical signal and then converts the analog electrical signal into a digital signal.

The camera signal processing unit 1015 performs predetermined resizing processes such as pixel interpolation/reduction, color conversion, various types of correction processes, and so on, on the digital signal obtained through the conversion performed by the image sensor 1014, under the control of the CPU 1001.

The encoding/decoding processing unit 1016 compresses and encodes the digital signal processed by the camera signal processing unit 1015 at a predetermined bitrate and in a predetermined format, or decodes compressed and encoded video data, under the control of the CPU 1001.

Although no particular configurations regarding audio are shown here, the configuration also includes a microphone, an A/D converter for digitizing an analog audio signal, and a unit for encoding digital data in the case where the video is to be distributed with audio. Of course, video data including audio is then generated by recording audio along with the video when recording video and then multiplexing the video and audio using the encoding/decoding processing unit 1016.

The input processing unit 1004 accepts user operations through an operating unit 1005, generates control signals based on those operations, and supplies the control signals to the CPU 1001. For example, the operating unit 1005 includes, as input devices for accepting user operations, a text information input device such as a keyboard, a pointing device such as a mouse or touch panel, and the like. The operating unit 1005 also includes a remotely-operable device such as an infrared light-based remote controller. Note that the "touch panel" mentioned here refers to an input device in which coordinate information is outputted based on locations on an input unit, configured as a flat surface, that have been touched. Through this, the camera 1000 can be caused to operate in accordance with user operations.

The output processing unit 1006 outputs a display signal for causing a display unit 1007 to carry out a display, based on display data such as a graphical user interface (GUI) generated by the CPU 1001 in accordance with a program.

Note that in the case where a touch panel is used as the operating unit 1005, the operating unit 1005 and the display unit 1007 can be configured as a single integrated unit. For example, the touch panel is configured having a light transmissibility that does not interfere with the display of the display unit 1007, and is attached to the upper layer of a display surface of the display unit 1007. An input coordinate system of the touch panel is then associated with a display coordinate system of the display unit 1007. This makes it possible to configure a GUI that makes the user feel as if he or she is actually directly manipulating the screen displayed in the display unit 1007.

The recording medium control unit 1011 is connected to the recording medium 1012, which is an HDD, a non-volatile semiconductor memory, or the like, and reads out data from the connected recording medium 1012, writes data to the recording medium 1012, and so on under the control of the CPU 1001. Note that the recording medium 1012 that can be connected to the recording medium control unit 1011 may also include a removable non-volatile semiconductor memory such as a memory card that is connected via a socket or the like (not shown).

In addition to captured video data, the recording medium 1012 can also record information required for control performed by the CPU 1001.

The communication control unit 1008 communicates with the communication apparatus 2000 and other external apparatuses via a connector (wired)/antenna (wireless) 1009, under the control of the CPU 1001. IEEE 802.11, Bluetooth (registered trademark), and the like for wireless connections, and IEEE 802.3 and the like for wired connections, can be used as the method for communication.

Note that the hardware configuration is not limited to that shown in FIG. 1; for example, a single piece of hardware may carry out display control, communication control, recording control, image processing control, and so on, and function as the various units of the camera 1000. Likewise, a plurality of pieces of hardware may operate in tandem to function as a single unit.

Configuration of Communication Apparatus

Next, an overview of the configuration and functions of the communication apparatus according to the embodiment of the present invention will be given with reference to FIG. 2.

Figure 2:
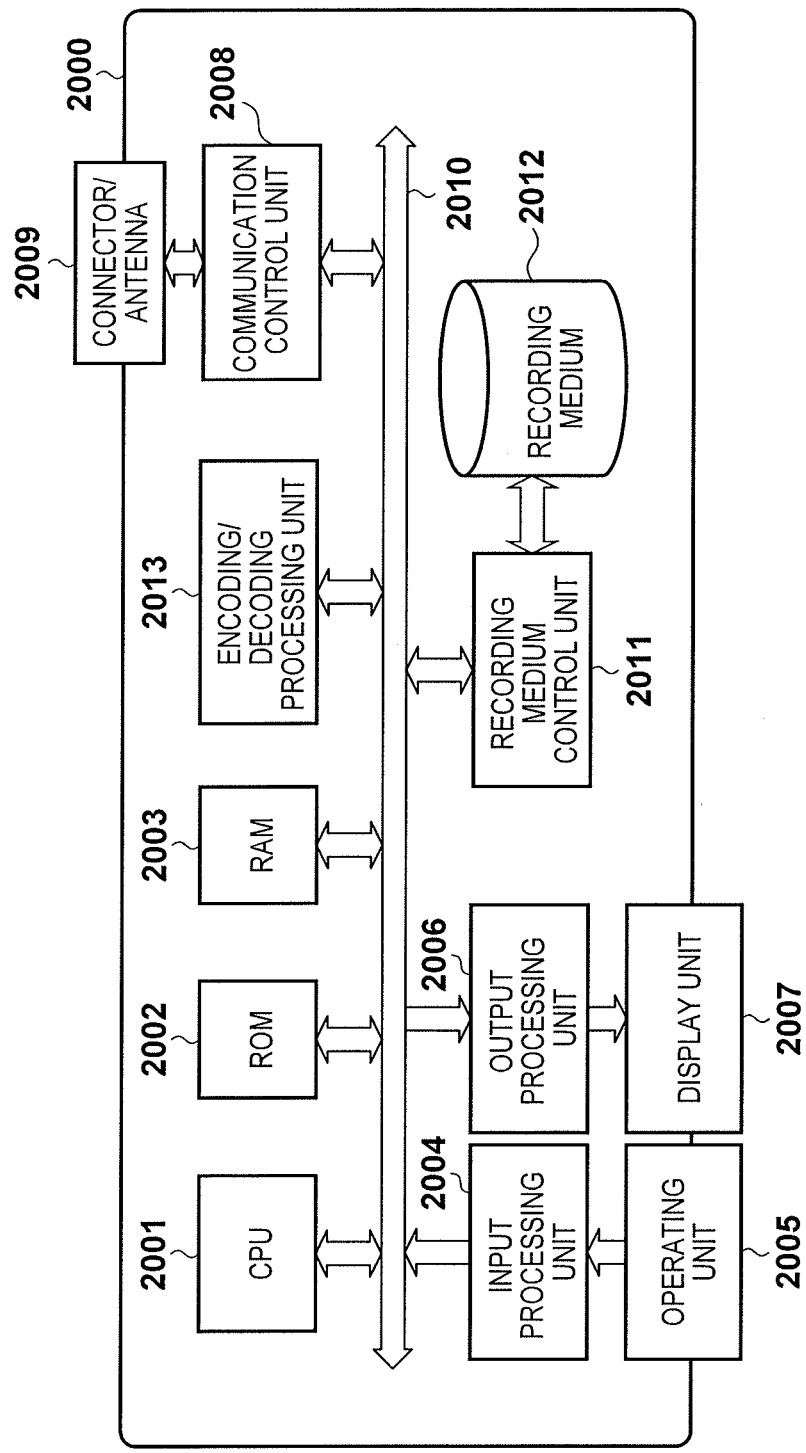
FIG. 2 is a block diagram illustrating an example of the configuration of a communication apparatus according to the embodiment of the present invention.

The communication apparatus ("terminal" hereinafter) 2000 shown in FIG. 2 is largely the same as the camera 1000, and thus descriptions of a CPU 2001 to a recording medium 2012, which are the same as the corresponding descriptions regarding the camera 1000, will be omitted. An encoding/decoding processing unit 2013 decodes compressed/encoded video data and re-encodes decoded data as necessary, under the control of the CPU 2001.

Live Streaming Operations

Next, live streaming operations performed by the system according to the present embodiment using a playlist will be described.

First, basic streaming operations performed by the system according to the present embodiment using a playlist will be described.

1. The camera (server) divides streaming data into segments of set amounts of time, and generates a playlist that lists acquisition sources of those segments. In the case of live streaming, the content is generated in real time, and thus the segments are generated periodically. Accordingly, live streaming uses a sliding window-type playlist in which when a new segment is generated, the playlist is updated (through deletion and addition) dynamically with the new content.

2. The terminal (client) acquires and analyzes the playlist, and obtains the data from the segment data acquisition sources in order of the stated listing.

3. The terminal (client) reproduces and displays or stores the acquired data.

4. The camera (server) and the terminal (client) repeat steps 1 to 3 until the playlist ends (the streaming ends).

Next, live streaming operations performing by the system according to the present embodiment using a playlist will be described with reference to FIGS. 1 to 3 and 8, in light of the basic operations described thus far.

When a user executes a live streaming mode in the camera 1000 using the operating unit 1005, the camera 1000 sets the communication control unit 1008 to a communicable state under the control of the CPU 1001.

Furthermore, a user of the terminal 2000 launches applications necessary for communication connection processing and live streaming processing by operating an operating unit 2005. In response to this, the CPU 2001 of the terminal 2000 controls a communication control unit 2008 to start communication with the camera 1000 and carry out a connection process, in accordance with the programs stored in a ROM 2002 or the recording medium 2012.

Here, it is assumed that the camera 1000 and the terminal 2000 employ Hypertext Transfer Protocol (HTTP)/Transmission Control Protocol (TCP) as the protocol for communication. The devices are also assumed to be Universal Plug and Play (UPnP)-compliant for the communication connection. Upon connecting to a network, the UPnP-compliant terminal 2000 sets an Internet Protocol (IP) address through the Dynamic Host Configuration Protocol (DHCP) or AutoIP. In order to discover other devices on the same network, the device that has acquired an IP address searches out other devices and acquires information such as the types of responding devices, service functions, and so on through "device discovery and control" (step 3003). In response to a device search request from the terminal 2000, the camera 1000 returns device information and device-unique information such as playlist acquisition source information (step 3004).

When the connection process between the camera 1000 and the terminal 2000 is complete, the camera 1000 starts live streaming.

Figure 8:
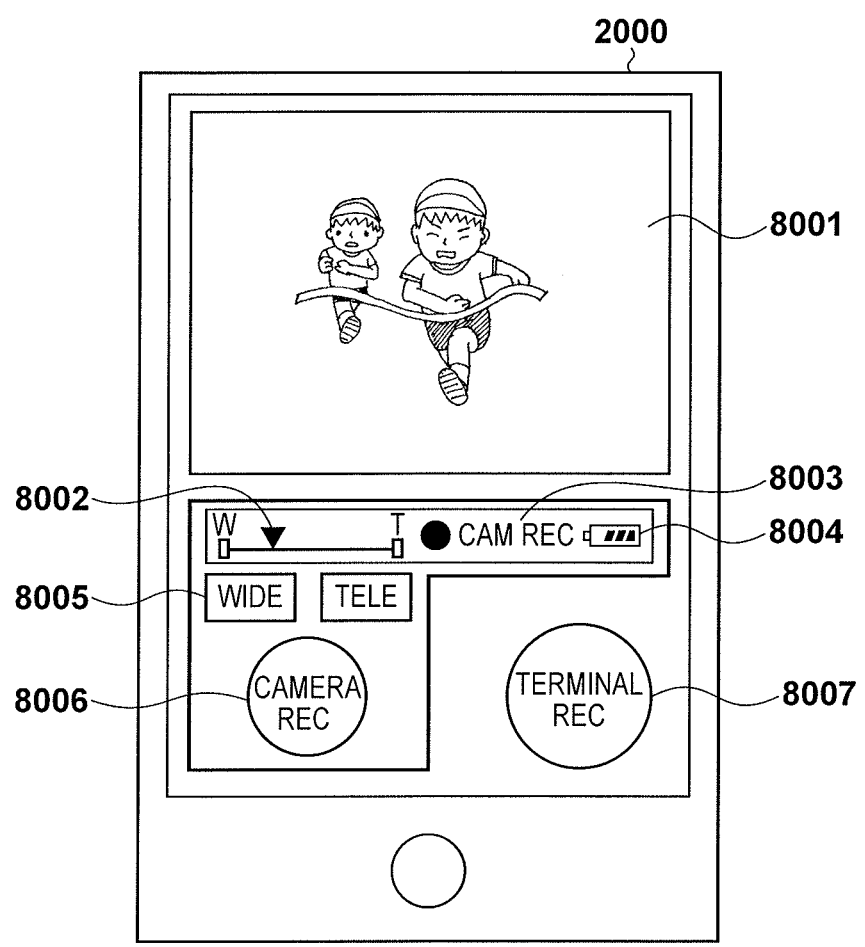
FIG. 8 is a diagram illustrating an example of a live streaming screen in the communication apparatus according to the embodiment.

FIG. 8 illustrates an example of an application screen in the terminal 2000 during live streaming, and shows an example in which the operating unit 2005 and a display unit 2007 are integrated as a single unit. Live streaming data is displayed in a display area 8001, and the status of the camera 1000 is indicated by zoom position information 8002, a recording state 8003, battery information 8004, and so on. Zoom buttons 8005, camera REC 8006, terminal REC 8007, and so on are provided as operable items.

During live streaming, the CPU 1001 of the camera 1000 starts the output of a signal from the image sensor 1014; the output is processed into appropriate video data by the camera signal processing unit 1015, after which the resulting data is sent to the encoding/decoding processing unit 1016.

Returning to FIG. 3, the encoding/decoding processing unit 1016 compresses and encodes the received video data and the like at a predetermined bitrate and in a predetermined format, divides the data into predetermined lengths of time Ts, and stores the lengths of time Ts in the RAM 1003 or the recording medium 1012 as segment data (3002). Note that the present embodiment assumes that Ts=0.5 seconds. Note also that a variety of methods for generating the segment data can be considered. One such method divides the video data into a plurality of segments having lengths of time corresponding to Ts upon receiving video data of a certain overall length of time. Another method generates segments sequentially, one at a time, each time video data of the length of time Ts is received. Regardless of which method is employed, a "segment" corresponds to video data that has been divided.

The CPU 1001 generates path information associated with a storage location of the stated segment data. The path information is used by the terminal 2000 as acquisition source information when acquiring segments, and the CPU 1001 generates a playlist 3001 and records segment information along with the path information.

The playlist 3001 will now be described with reference to FIG. 4.

A playlist 4010 shown in FIG. 4 is a playlist in the Extended M3U format, and an identifier tag is written in a first line 4011, whereas a tag indicating a playlist version as well as the version of the playlist are written in a second line 4012. In this example, the version is "3". A tag indicating the time of segment data 3002, and an integer or decimal indicating that time (in seconds), are written in a third line 4013. In the present embodiment, the segment data time length Ts=0.5 (seconds), and thus "0.5" is written in this example. An acquisition source path (including query parameters) of the segment data 3002 is written in a fourth line 4014. It is absolutely necessary for the third line 4013 and the fourth line 4014 to be written consecutively as information regarding the segment data 3002.

Figure 3:
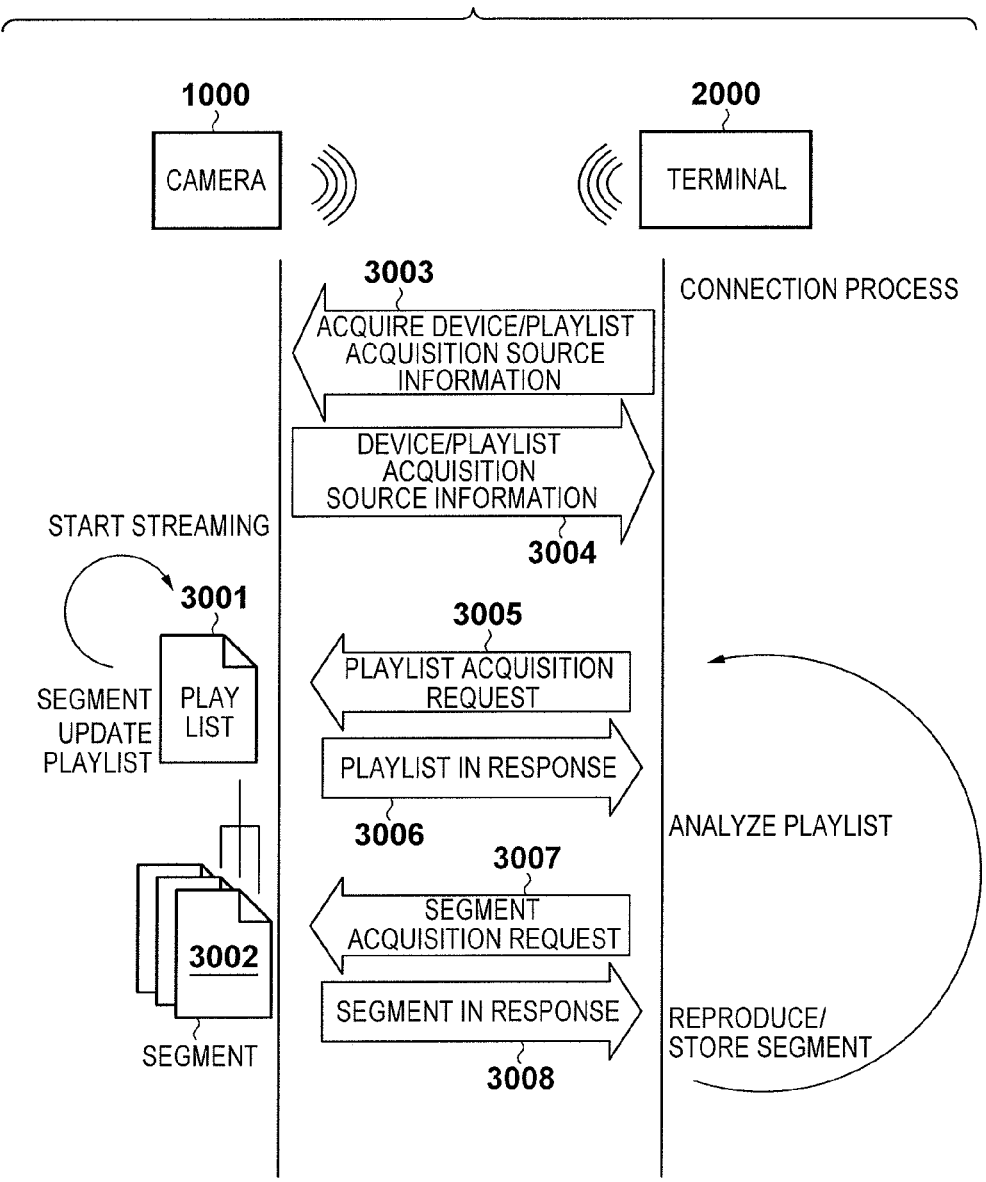
FIG. 3 is a diagram illustrating live streaming operations in a system according to the embodiment.

The playlist 4010 serves as an example of the details of the playlist 3001 shown in FIG. 3, in which the segment information 4013 and 4014 have been recorded.

The terminal 2000 stores the predetermined length of time Ts of the segment data 3002 in advance, or obtains that length of time Ts when acquiring the device information of the camera 1000 by that length of time Ts being included in the device information.

Approximately Ts (seconds) after starting live streaming, the terminal 2000 makes a playlist acquisition request (HTTP GET method) to the playlist acquisition source acquired in step 3004 (step 3005).

The camera 1000 transmits the playlist 3001 in which a single instance of the segment information 4013 and 4014 (that is, the playlist 4010) is written as the playlist for the response (step 3006).

The terminal 2000 analyzes the received playlist 4010 and makes a segment acquisition request (HTTP GET method) to the source from which the segment information was acquired (step 3007).

The camera 1000 transmits the requested segment 3002 as the segment for the response (step 3008).

The terminal 2000 passes the received segment 3002 to the encoding/decoding processing unit 2013, and after decoding, reproduces and displays the segment in the display unit 2007 via an output processing unit 2006. In addition, when the user inputs an instruction to terminal REC 8007 using the live streaming application, the decoded data or a data portion of the segment 3002 excluding the header and so on thereof is recorded into the recording medium 2012. The segment data received sequentially thereafter is linked to the already-received data and recorded as well.

During streaming, the camera 1000 generates a segment approximately every Ts (seconds) and updates the playlist. The segment information acquired from the terminal 2000, meanwhile, is deleted from the playlist.

Each time the playlist is updated in the camera 1000, the terminal 2000 acquires the playlist approximately every Ts (seconds) (step 3005), and makes an acquisition request for that segment data based on the segment information denoted in the playlist 3001.

Figure 5:
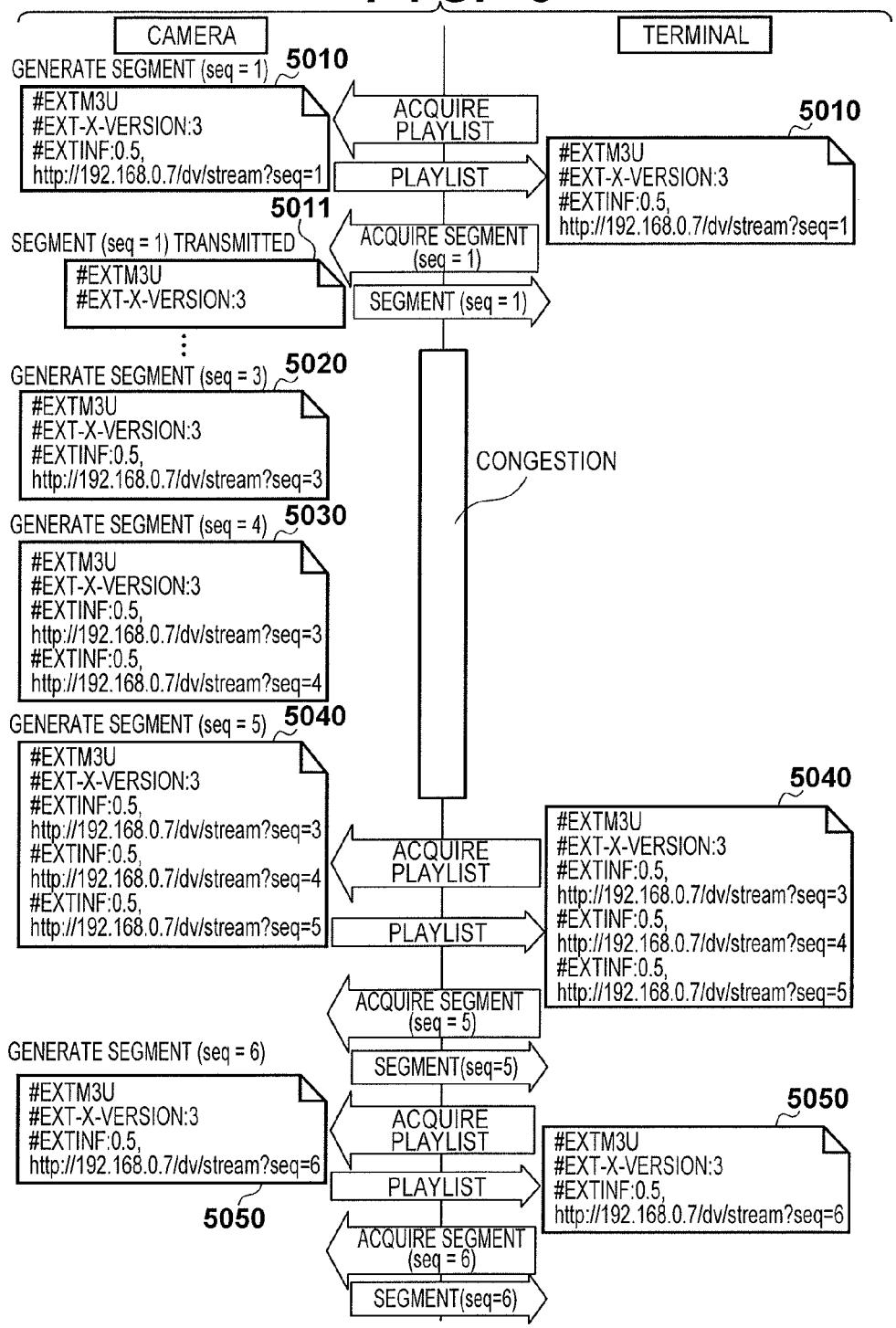
FIG. 5 is a diagram illustrating an example of a playlist that includes a period of congestion according to the embodiment.

In the case where the state of communication is favorable, the series of processes from the playlist acquisition (step 3005) to the segment in response (step 3008) is carried out periodically. However, in actuality, this communication cannot be carried out periodically due to congestion or the like. FIG. 5 illustrates an example of the transmission and reception of the playlist during congestion; during congestion, playlists 5020, 5030, and 5040, as well as segment information, are added.

Note that in the request process performed by the terminal 2000 (step 3005 and 3007), a unique ID of the terminal or the application is added. Then, the camera 1000 according to the present embodiment streams the data only in response to the ID from which the first request was received. In other words, the camera 1000 and the terminal 2000 according to the present embodiment only carry out streaming over a one-to-one connection.

System Operations

Figure 6:
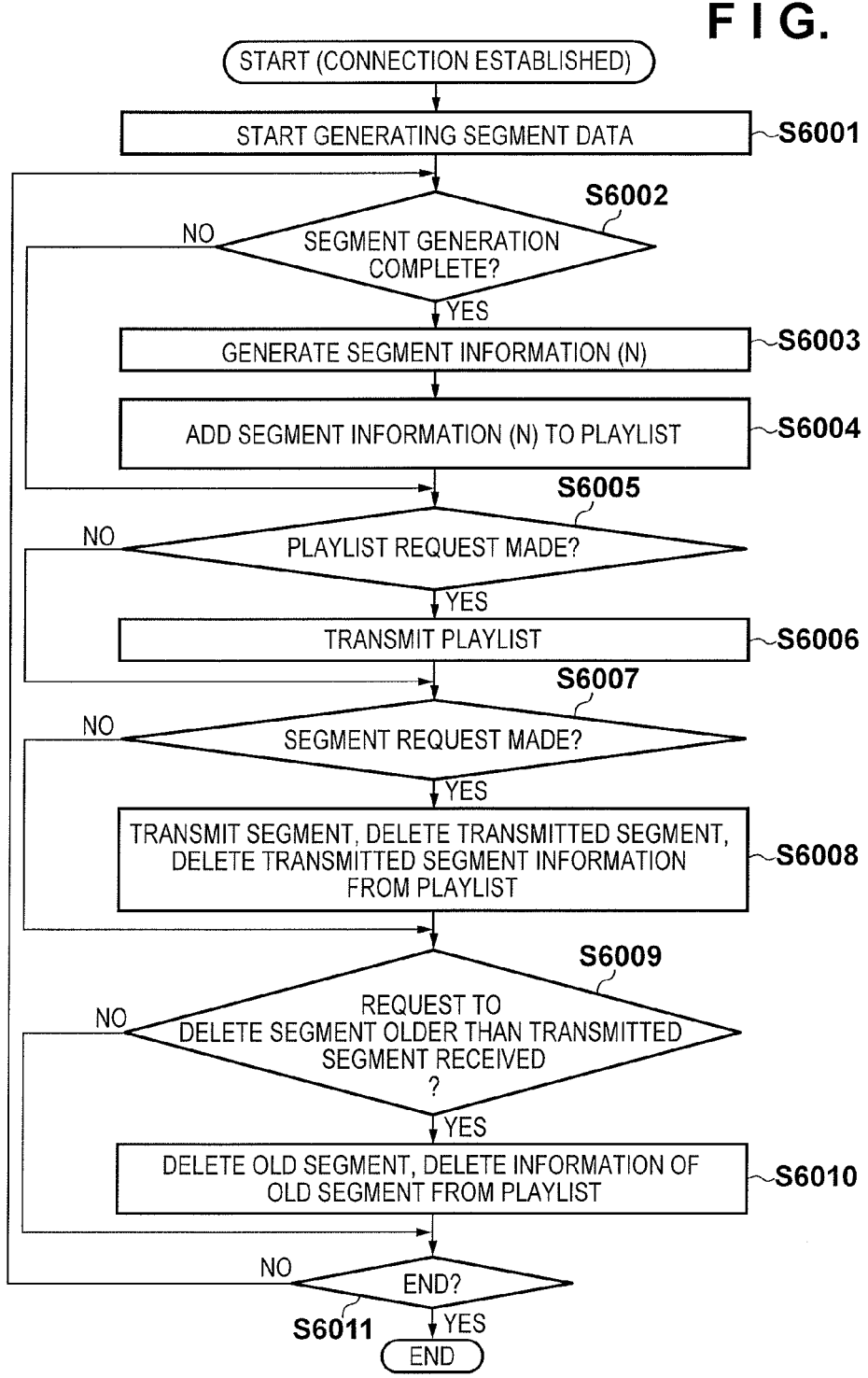
FIG. 6 is a flowchart illustrating operations performed by the image capturing apparatus according to the embodiment.
Figure 7:
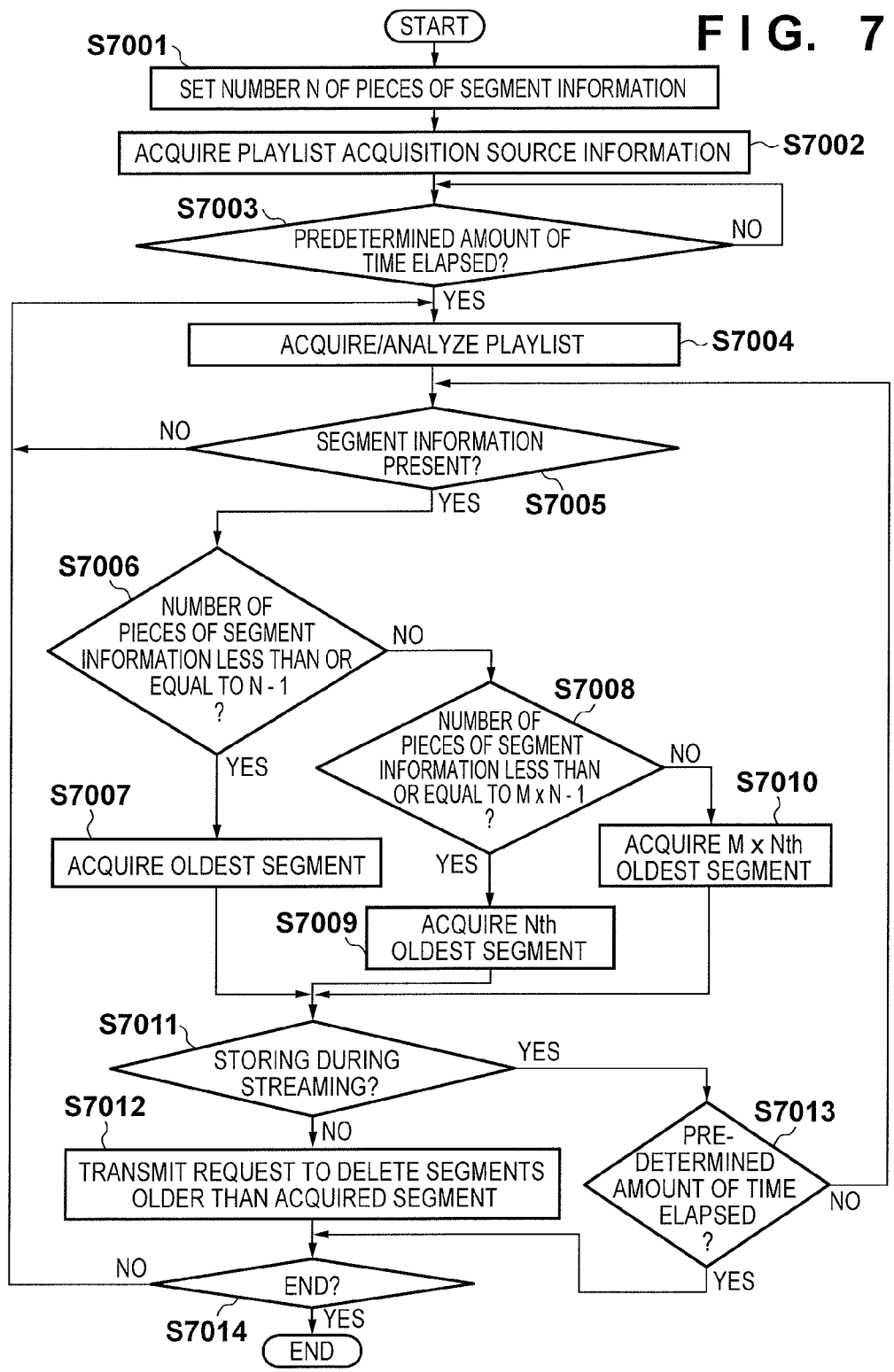
FIG. 7 is a flowchart illustrating operations performed by the communication apparatus according to the embodiment.

Next, operations performed by the camera 1000 and the terminal 2000 that configure the system according to the present embodiment will be described with reference to FIGS. 6 and 7.

First, processes executed by the camera 1000 after a connection has been established between the camera 1000 and the terminal 2000 will be described with reference to FIG. 6. Note that the processes described hereinafter are realized by the CPU 1001 of the camera 1000 controlling the respective units of the camera 1000 based on various types of programs, input signals, and so on.

In step S6001, a process for starting the generation of segment data is executed for starting the live streaming. The CPU 1001 starts the output of a signal from the image sensor 1014; the output is processed into appropriate video data by the camera signal processing unit 1015, after which the resulting data is passed to the encoding/decoding processing unit 1016. The encoding/decoding processing unit 1016 compresses and encodes the received video data at a predetermined bitrate and in a predetermined format, and furthermore starts a process for dividing the data into the predetermined lengths of time Ts (0.5 seconds, in the present embodiment).

In step S6002, it is determined whether or not the generation of a single segment (0.5 seconds) is complete. It is confirmed whether the 0.5 seconds' worth of divided data has been temporarily stored in the RAM 1003 or the recording medium 1012; in the case where the data has been stored, the process advances to step S6003, whereas in the case where the data has not been stored, the process advances to step S6005. Although this step is described as a determination based on an inquiry (polling), it is also possible to determine whether the generation is complete using a method such as detecting whether the divided segment data has been written and making an interrupt notification or the like. In addition, in the case where no empty regions are available in the RAM 1003 or the recording medium 1012 when storing the segment data, the earliest segment is discarded and the new data is written and stored in the region in which that segment data had been stored.

In step S6003, the segment information is generated. The length of time of the generated segment data, as well as path information associated with a storage location address, a filename, or the like and enabling the segment data to be specified, are generated. In the present embodiment, the length of time of the segment is fixed at 0.5 seconds. Note that in the case where the earliest segment has been discarded in step S6002, the segment information corresponding to that segment is also deleted.

In step S6004, the segment information generated in step S6003 is added to the playlist. For example, a playlist 5011 shown in FIG. 5 is updated to the playlist 5020, and the playlist 5030 is updated to the playlist 5040.

In step S6005, it is determined whether or not a playlist acquisition request (step 3005) has been received from the terminal 2000. The process advances to step S6006 in the case where the playlist acquisition request has been received, and advances to step S6007 in the case where the playlist acquisition request has not been received.

In step S6006, the playlist is transmitted (step 3006) in response to the playlist acquisition request (step 3005).

In step S6007, it is determined whether or not a segment acquisition request (step 3007) has been received from the terminal 2000. The process advances to step S6008 in the case where the segment acquisition request has been received, and advances to step S6009 in the case where the segment acquisition request has not been received.

In step S6008, the corresponding segment is transmitted (step 3008) in response to the segment acquisition request (step 3007). The transmitted segment is then deleted, the information regarding the segment is deleted from the playlist, and the process advances to step S6009. For example, a playlist 5010 shown in FIG. 5 is updated to the playlist 5011.

In step S6009, it is determined whether or not a request to delete a segment older than the segment transmitted in step S6008 has been received from the terminal 2000. The process advances to step S6010 in the case where the deletion request has been received, and advances to step S6011 in the case where the deletion request has not been received.

In step S6010, the segment for which the deletion request has been made is deleted, and information regarding the segment is deleted from the playlist. For example, the playlist 5040 shown in FIG. 5 is updated to a playlist 5050.

In step S6011, it is determined whether or not the process is complete, and the process returns to step S6002 in the case where the process is not complete.

Although the respective event determination steps S6002, S6005, S6007, and S6009 of this flow have been described as determinations made through sequential inquiries, the processes may be executed in the order at which the events occur in the case where the system simultaneously stands by for the events corresponding to the respective conditions.

Next, processes executed by the terminal 2000 after the terminal 2000 has established a connection with the camera 1000 will be described with reference to FIG. 7. Note that the processes described hereinafter are realized by the CPU 2001 of the terminal 2000 controlling the respective units of the terminal 2000 based on various types of programs, input signals, and so on.

In step S7001, a number of pieces of segment information (a first number) N used in the subsequent steps is set. The meaning of this number will be described later in detail. In the present embodiment, the descriptions assume that N=3. Note that N can also be set as desired by the user through the operating unit 2005.

In step S7002, the playlist acquisition source information is acquired from the device/playlist acquisition source information acquired when the connection was established (step 3004), and is stored.

In step S7003, it is determined whether or not a predetermined amount of time has elapsed. The process advances to step S7004 in the case where the predetermined amount of time has elapsed, whereas step S7003 is repeated in the case where the predetermined amount of time has not elapsed. Here, it is desirable for the "predetermined amount of time" to be the same value as that of the predetermined length of time Ts generated by the camera 1000.

In step S7004, the playlist acquisition request (step 3005) is carried out using the playlist acquisition source information acquired in step S7001, and the playlist acquired from the camera 1000 is analyzed. In the playlist analysis, the playlist format and version are confirmed using the identifier tag, after which the segment information is acquired.

In step S7005, it is determined whether or not segment information was present in step S7004. The process advances to step S7006 in the case where the segment information was present, and returns to step S7004 in the case where the segment information was not present.

In step S7006, it is determined whether or not the number of pieces of segment information denoted in the playlist acquired in step S7004 is less than or equal to N−1, or in other words, whether or not the number exceeds N. In the present embodiment, N=3, and thus the process advances to step S7007 in the case where the number of pieces of segment information is 1 or 2 and advances to step S7008 in the case where the number is 3 or more.

In step S7007, a segment acquisition request (step 3007) indicating the acquisition source path of the segment information is made, and a segment is acquired from the camera 1000. Here, if one piece of segment information has been acquired, the segment that is acquired is the earliest segment. Meanwhile, in the case where a plurality of pieces of segment information have been acquired, the oldest of the segments is taken as the earliest segment. The acquired segment is recorded into a RAM 2003 or the recording medium 2012, is passed to the encoding/decoding processing unit 2013 and decoded, and is then reproduced and displayed (displayed as video) in the display unit 2007 via the output processing unit 2006. However, in the case where the acquired segment is not the latest segment among the segments that have already been acquired, that segment is not used in the reproduction. In addition, in the case where terminal REC 8007 is executed through the live streaming application, the decoded data or the data portion of the segment excluding the header and so on thereof is stored in the recording medium 2012 using a different process from that illustrated in the flowchart of FIG. 7. Here, by connecting the received segment data according to the original order, data can be reproduced with few breaks, in addition to being reproduced.

In step S7008, it is determined whether or not the number of pieces of segment information denoted in the playlist acquired in step S7004 is less than or equal to M×N−1, or in other words, whether or not the number exceeds M×N (a second number). Note that M indicates a magnification, and can also be set as desired by the user through the operating unit 2005. In the present embodiment, N=3 and M=2, and thus the process advances to step S7009 in the case where the number of pieces of segment information is 3 to 5 and advances to step S7010 in the case where the number of pieces of segment information is 6 or more.

In step S7009, a segment acquisition request (step 3007) indicating the acquisition source path of the segment information is made, and a segment is acquired from the camera 1000. Note that the segment for which the acquisition request (step 3007) is made is the Nth oldest segment. By performing this step, even if delay occurs due to congestion, the delay can be smoothly reduced. The acquired segment is recorded into the RAM 2003 or the recording medium 2012, is passed to the encoding/decoding processing unit 2013 and decoded, and is then reproduced and displayed (displayed as video) in the display unit 2007 via the output processing unit 2006. However, in the case where the acquired segment is not the latest segment among the segments that have already been acquired, that segment is not used in the reproduction. In addition, in the case where terminal REC 8007 is executed through the live streaming application, the decoded data or the data portion of the segment excluding the header and so on thereof is stored in the recording medium 2012 using a different process from that illustrated in the flowchart of FIG. 7. Here, by connecting the received segment data according to the original order, data can be reproduced with few breaks, in addition to being reproduced.

In step S7010, a segment acquisition request (step 3007) indicating the acquisition source path of the segment information is made, and a segment is acquired from the camera 1000. Note that the segment for which the acquisition request (step 3007) is made is the M×Nth oldest segment. By performing this step, even if delay due to congestion has increased greatly, the delay can be quickly and smoothly reduced. The acquired segment is recorded into the RAM 2003 or the recording medium 2012, is passed to the encoding/decoding processing unit 2013 and decoded, and is then reproduced and displayed in the display unit 2007 via the output processing unit 2006. In addition, in the case where terminal REC 8007 is executed through the live streaming application, the decoded data or the data portion of the segment excluding the header and so on thereof is stored in the recording medium 2012 using a different process from that illustrated in the flowchart of FIG. 7.

In step S7011, it is determined whether or not terminal REC 8007 is being executed through the live streaming application. In the case where terminal REC 8007 is being executed, the process advances to step S7013, whereas in the case where terminal REC 8007 is not being executed, the process advances to step S7012.

In step S7012, a request to delete the oldest segment from the acquired segments is transmitted. This is because in the case where terminal REC 8007 is not being executed through the live streaming application, the oldest segment among the acquired segments is not necessary. Although the transmission of the deletion request is described here as being the independent step S7012, the processes of steps S7011 and S7012 may instead be included in the processes of steps S7007, S7009, and S7010. In other words, the same processing can be realized by carrying out the determination of step S7011 in the segment acquisition requests in steps S7007, S7009, and S7010, and adding parameters indicating the deletion request to the query parameters in the segment acquisition request in the case where it has been determined to carry out the deletion request.

In step S7013, it is determined whether or not a predetermined amount of time has elapsed. The process advances to step S7014 in the case where the predetermined amount of time has elapsed, and returns to step S7005 in the case with a predetermined amount of time has not elapsed. By returning to step S7005 in the case where the predetermined amount of time has not elapsed, the segment can be reacquired in the case where the segment information is not yet present in the playlist; then, by connecting the acquired segment data according to the original order, data can be reproduced with few breaks, in addition to being reproduced. Note that in the case where step S7010 has been executed, the process may be forcefully returned to step S7005.

In step S7014, it is determined whether or not the process is complete, and the process returns to step S7004 in the case where the process is not complete.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiments of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149934, filed Jul. 18, 2013 which is hereby incorporated by reference herein in its entirety.

What is claimed is:

1. An information processing apparatus which has a communication unit configured to communicate with an image capturing apparatus, and which reproduces video data obtained by sequentially acquiring segments each of which is a portion of the video data obtained by image capturing of the image capturing apparatus, the information processing apparatus comprising at least one processor configured to function as:
   a list requesting unit configured to request, via the communication unit, a segment list in which information of segments indicating at least one segment which the image capturing apparatus has not yet sent to the information processing apparatus among segments of video data being captured by the image capturing apparatus is written, from the image capturing apparatus;
   a list acquiring unit configured to acquire the segment list requested by the list requesting unit;
   a determination unit configured to determine which segment, from the segments in the segment list acquired by the list acquiring unit, to be played;
   a segment requesting unit configured to request, via the communication unit, the segment determined by the determination unit, from the image capturing apparatus; and
   a segment acquiring unit configured to acquire the segment requested by the segment requesting unit,
   wherein in the case where a number of segments in the segment list acquired by the list acquiring unit is greater than a first threshold, the segment requesting unit requests a predetermined segment from the segments in the segment list; and
   wherein the predetermined segment among segments which has not been sent yet is neither the latest segment nor the earliest segment in the segment list.

2. The apparatus according to claim 1, wherein the list requesting unit requests the segment list periodically; and
   the determination unit determines the segment to request based on the latest segment list.

3. The apparatus according to claim 1, wherein in the case where the number of segments in the segment list is less than the first threshold, the determination unit determines to request the earliest segment from the segments in the segment list.

4. The apparatus according to claim 1, wherein in the case where the number of segments in the segment list is greater than the first threshold, the determination unit determines to request the segment, from the segments in the segment list, that is newer by an amount equivalent to the first threshold.

5. The apparatus according to claim 1, wherein in the case where the number of segments in the segment list is greater than a second threshold obtained by multiplying the first threshold by a predetermined magnification, the determination unit determines to request the segment, from the segments in the segment list, that is newer by an amount equivalent to the second threshold.

6. The apparatus according to claim 1, further comprising a recording unit configured to record the segment acquired by the segment acquiring unit,
   wherein the segment requesting unit requests the segment periodically while the segment obtained by the segment acquiring unit is being recorded.

7. The apparatus according to claim 6, further comprising an instructing unit configured to instruct the image capturing apparatus to delete, from the list, the information of a segment older than the segment acquired by the segment acquiring unit,
   wherein the instructing unit does not transmit the instruction to delete to the image capturing apparatus while the acquired segment is being recorded by the recording unit.

8. The apparatus according to claim 1, further comprising a first setting unit configured to set the first threshold.

9. The apparatus according to claim 5, further comprising a second setting unit configured to set the second threshold.

10. The apparatus according to claim 1, wherein the information processing apparatus is a mobile phone.

11. The apparatus according to claim 1, wherein the information processing apparatus is a tablet terminal.

12. The apparatus according to claim 1, wherein the communication unit communicates with the image capturing apparatus over a wireless network.

13. A control method of an information processing apparatus which has a communication unit configured to communicate with an image capturing apparatus, and which reproduces video data obtained by sequentially acquiring segments each of which is a portion of the video data obtained by image capturing of the image capturing apparatus, the method comprising:

requesting, via the communication unit, a segment list in which information of segments indicating at least one segment which the image capturing apparatus has not yet sent to the information processing apparatus among segments of video data being captured by the image capturing apparatus is written, from the image capturing apparatus;

acquiring the requested segment list;

determining which segment, from the segments in the acquired segment list, to be played;

requesting, via the communication unit, the determined segment from the image capturing apparatus; and acquiring the requested segment, wherein in the case where the number of segments in the acquired segment list is greater than a first threshold, a predetermined segment from the segments in the segment list is requested; and wherein the predetermined segment among segments which has not been sent yet is neither the latest segment nor the earliest segment in the segment list.

14. A non-transitory computer-readable storage medium storing a program for causing a computer to execute a control method of an information processing apparatus which has a communication unit configured to communicate with an image capturing apparatus, and which reproduces video data obtained by sequentially acquiring segments each of which is a portion of the video data obtained by image capturing of the image capturing apparatus, the method comprising:

requesting, via the communication unit, a segment list in which information of segments indicating at least one segment which the image capturing apparatus has not yet sent to the information processing apparatus among segments of video data being captured by the image capturing apparatus is written, from the image capturing apparatus;

acquiring the requested segment list;

determining which segment, from the segments in the acquired segment list, to be played;

requesting, via the communication unit, the determined segment from the image capturing apparatus; and acquiring the requested segment, wherein in the case where the number of segments in the acquired segment list is greater than a first threshold, a predetermined segment from the segments in the segment list is requested; and wherein the predetermined segment among segments which has not been sent yet is neither the latest segment nor the earliest segment in the segment list.

\* \* \* \* \*